C. B. Cottrell,
Tempering Steel.
No. 97,054.   Patented Nov. 23, 1869.
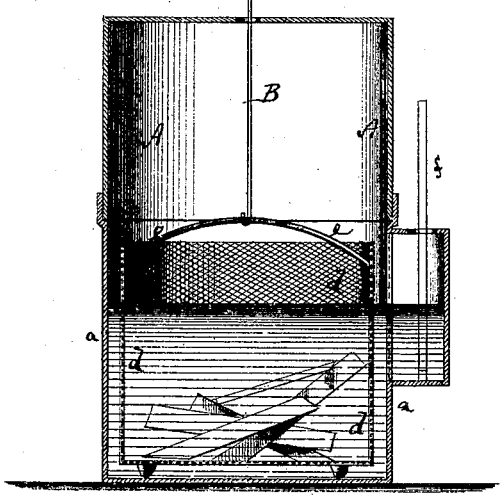
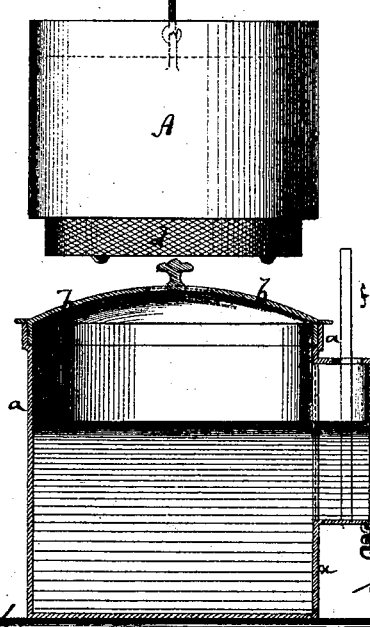
Witnesses:   Inventor:
Gustave Dieterich   C. B. Cottrell
Alex F. Roberts   per
    Attorneys.

United States Patent Office.

C. B. COTTRELL, OF WESTERLY, RHODE ISLAND.

Letters Patent No. 97,054, dated November 23, 1869.

IMPROVED APPARATUS FOR TEMPERING STEEL.

The Schedule referred to in these Letters Patent and making part of the same.

*To all whom it may concern:*

Be it known that I, C. B. COTTRELL, of Westerly, in the county of Washington, and State of Rhode Island, have invented a new and improved Apparatus for Tempering Steel; and I do hereby declare that the following is a full, clear, and exact description thereof, which will enable others skilled in the art to make and use the same, reference being had to the accompanying drawing, forming part of this specification.

Figure 1 represents a vertical central section of my improved apparatus, showing it put up for operation.

Figure 2 is a side view, partly in section, of the same, showing the basket and hood taken out, after the heating-process is completed.

Similar letters of reference indicate corresponding parts.

This invention relates to an improvement on the apparatus for tempering steel, for which Letters Patent of the United States, No. 55,004, were granted to me on the 22d day of May, 1866.

The present invention consists in the application to the aforesaid apparatus of a cylindrical hood, A, which is open at the lower end and closed on top, and which can be fitted upon the vessel $a$, containing the tallow, oil, or other oleaginous tempering-medium, after the basket or perforated vessel $d$, containing the articles to be tempered, has been introduced in the same.

A hook, B, is introduced, through an aperture in the top of the hood, for the purpose of engaging the bail $e$ of the basket, and for lifting the basket $d$, with its contents, out of the tempering-liquid, allowing them to drain before removing the hood.

The operation of tempering is the same as described in the aforesaid Letters Patent.

When the thermometer $f$ indicates that the requisite degree of temperature has been reached, the hook is raised, and the basket is elevated within the hood, above the vessel $a$.

After the basket and contents have sufficiently drained, they are removed from the vessel $a$ with the hood, and then the cover $b$ is quickly applied to the vessel, before any combustion of the heated tempering-medium can take place.

Having thus described my invention,

I claim as new, and desire to secure by Letters Patent—

1. The employment of the hood A in connection with a tempering-apparatus, substantially as and for the purpose herein shown and described.

2. The combination of the hood A and basket $d$, substantially as and for the purposes herein shown and described.

C. B. COTTRELL.

Witnesses:
GEO. W. MABEE,
ALEX. F. ROBERTS.